(12) United States Patent
Chen et al.

(10) Patent No.: US 9,389,084 B1
(45) Date of Patent: Jul. 12, 2016

(54) DETECTING CHANGES IN AERIAL IMAGES

(71) Applicant: Skycatch, Inc., San Francisco, CA (US)

(72) Inventors: David Chen, San Francisco, CA (US); Ambar Pansari, San Francisco, CA (US); Christian Sanz, San Francisco, CA (US); Leonardo Felipe Romo Morales, Jalisco (MX)

(73) Assignee: SKYCATCH, INC., San Francisco, CA (US)

( * ) Notice: Subject to any disclaimer, the term of this patent is extended or adjusted under 35 U.S.C. 154(b) by 0 days.

(21) Appl. No.: 14/857,457

(22) Filed: Sep. 17, 2015

(51) Int. Cl.
  *G01C 21/00* (2006.01)
  *G01C 21/20* (2006.01)
(52) U.S. Cl.
  CPC ............... *G01C 21/00* (2013.01); *G01C 21/20* (2013.01)
(58) Field of Classification Search
  CPC ........... G01C 21/3635; G01C 21/3647; G01C 21/3632; G01C 21/3638
  USPC .......................................................... 701/436
  See application file for complete search history.

(56) References Cited

U.S. PATENT DOCUMENTS

| 2006/0239537 | A1* | 10/2006 | Shragai | G06K 9/0063 382/154 |
| 2013/0141540 | A1* | 6/2013 | Persson | G06K 9/0063 348/46 |
| 2015/0169723 | A1* | 6/2015 | Lee | G06F 17/30247 707/737 |

* cited by examiner

*Primary Examiner* — Ian Jen
(74) *Attorney, Agent, or Firm* — Keller Jolley Preece

(57) ABSTRACT

The present disclosure is directed toward systems and methods for identifying changes to a target site based on aerial images of the target site. For example, systems and methods described herein generate representations of the target site based on aerial photographs provided by an unmanned aerial vehicle. In one or more embodiments, systems and method described herein identify differences between the generated representations in order to detect changes that have occurred at the target site.

20 Claims, 7 Drawing Sheets

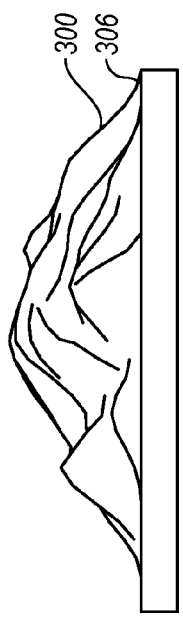
*Fig. 3B*
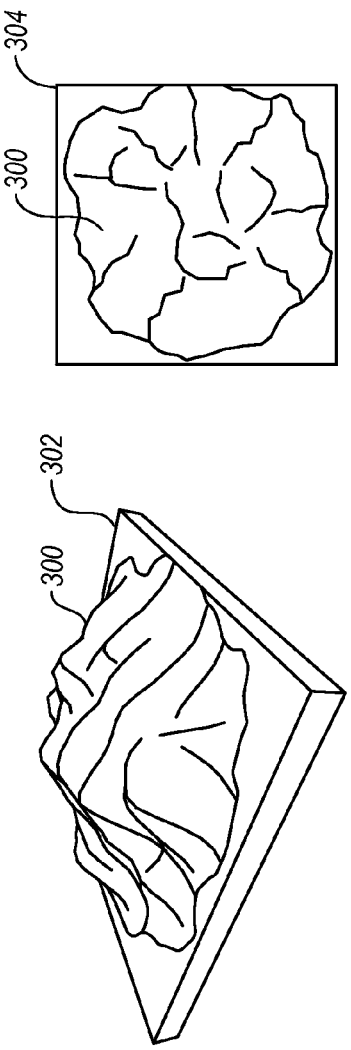
*Fig. 3A*
*Fig. 3C*
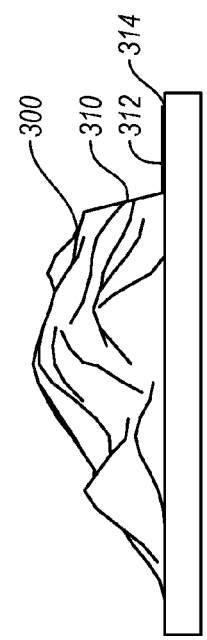
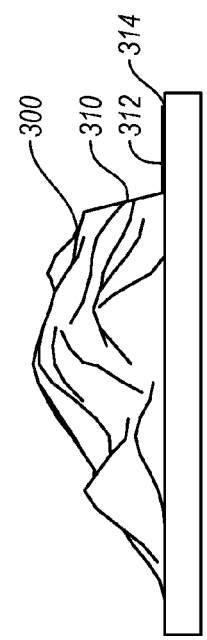
*Fig. 3E*
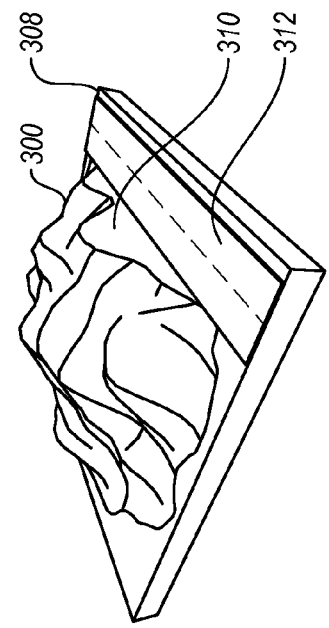
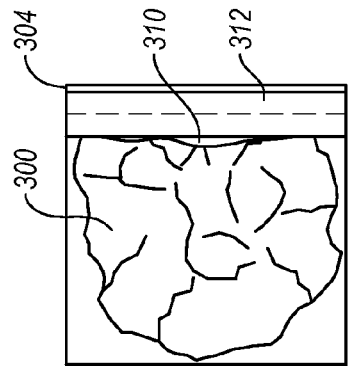
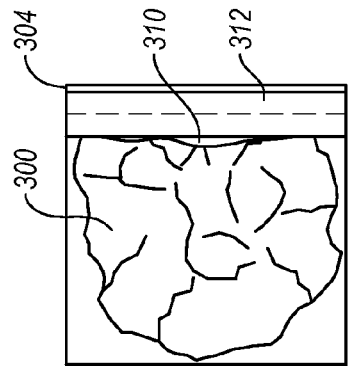
*Fig. 3D*
*Fig. 3F*

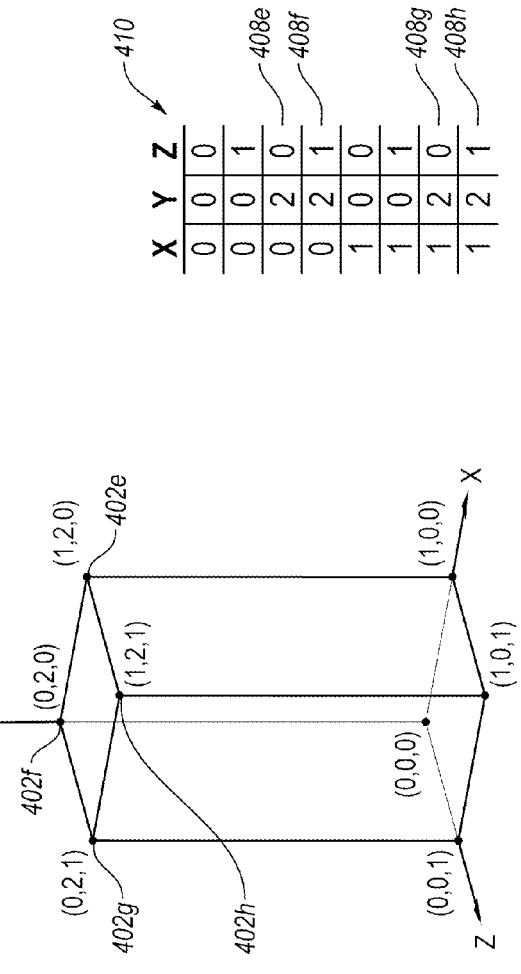

DETECTING CHANGES IN AERIAL IMAGES

CROSS REFERENCE TO RELATED APPLICATIONS

N/A

BACKGROUND

1. Technical Field

One or more embodiments described herein relate generally to systems and methods for analyzing aerial images. More specifically, one or more embodiments of the present disclosure relate to systems and methods of identifying changes to a target site based on aerial images of the target site.

2. Background and Relevant Art

Aerial photography is a valuable tool for obtaining information about an area, such as a work site or other property. For example, at a construction site, large machinery can dig holes, move debris, pile materials, etc. Accordingly, it can be useful for construction site managers to utilize aerial photographs to track the progress of work at the construction site. In another example, a crop farmer may utilize aerial photography in order to monitor the success of a particular crop. Thus, aerial photography generally provides information that is difficult to observe or gather from other vantage points.

However, a number of disadvantages exist with respect to identifying changes between aerial photographs (e.g., aerial photographs taken on different days). These disadvantages can make the process of identifying changes in aerial photographs time consuming, expensive, unsophisticated, and generally ineffective.

Thus, there are several disadvantages to current methods for detecting changes and differences in aerial photographs.

SUMMARY

One or more embodiments of the present disclosure provide benefits and/or solve one or more disadvantages in the art of detecting changes between aerial photographs. For example, according to one disclosed embodiment, a change detection system generates a first three-dimensional representation of a target site based on one or more first aerial images of the target site and generates a second three-dimensional representation of the target site based on one or more second aerial images of the target site. The change detection system then aligns the first three-dimensional representation and the second three-dimensional representation and analyzes the first three-dimensional representation and the second three-dimensional representation to identify differences between the first three-dimensional representation and the second three-dimensional representation. Thereafter, the change detection system generates a report indicating changes at the target site based on the differences between the first three-dimensional representation and the second three-dimensional representation. By so doing, the change detection system can provide a user (e.g., a manager or owner of the target site) with helpful and accurate information regarding the progress (e.g., construction progress) or other changes at the target site as will be explained in more detail below.

Additional features and advantages of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 3A-3F illustrate various views of an example target site in accordance with one or more embodiments;

FIGS. 4A-4E illustrate various three-dimensional representations of another example target site and changes identified at the target site in accordance with one or more embodiments;

DETAILED DESCRIPTION

One or more embodiments described herein provide an improved system and method for detecting changes at a target site based on aerial photography. For example, according to one or more embodiments, the disclosed change detection system receives aerial photographs of a target site taken by an unmanned aerial vehicle ("UAV") and uses the aerial photographs to generate three-dimensional representations of the target site over a period of time. The change detection system can then perform a comparison of multiple three-dimensional representations of the target site to identify how the target site has changed over the period of time. The change detection system can reflect the identified changes in a report for use by one or more users (e.g., a manager or owner of the target site).

In accordance with the embodiments disclosed here, and as will be discussed in more detail below, a user can quickly and easily identify changes at a target site from one day to another. As a result, the user can remain up-to-date on the progress at the target site and make informed decisions regarding any actions that need to be taken at the target site. To illustrate, using the methods and systems disclosed herein, a user may be able to quickly identify if a project (e.g., a construction project) is behind schedule, how and where the project is behind schedule, and then make course-correcting decisions in order to put the project back on schedule or otherwise compensate for the delay. The process by which aerial photographs are collected and processed, three-dimensional representations are generated and analyzed, and change reports are generated and provided is now described with reference to FIGS. 1-7.

Figure 1:
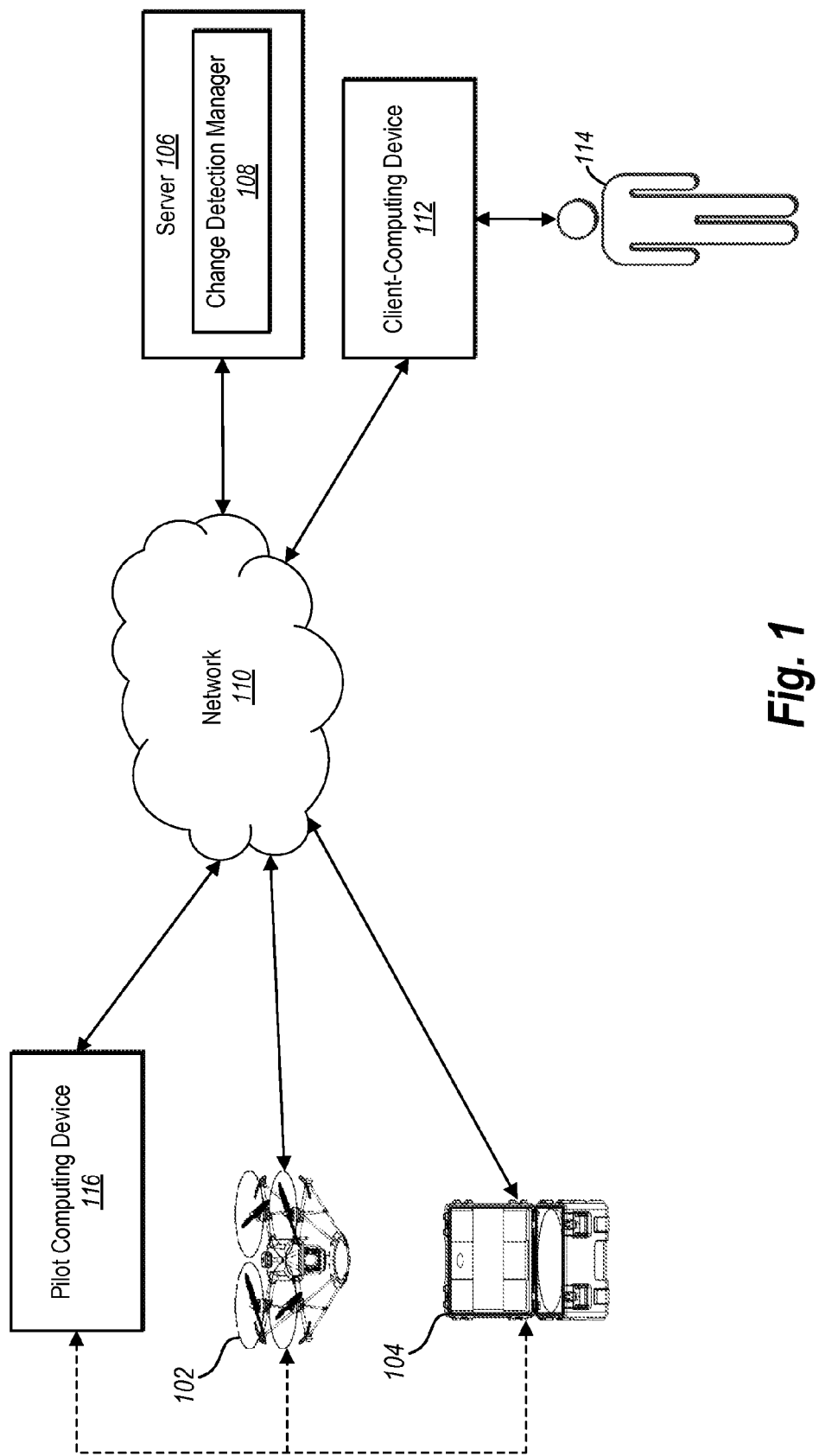
FIG. 1 illustrates a schematic diagram of a change detection system in accordance with one or more embodiments.

FIG. 1 is a schematic diagram illustrating a change detection system 100 in accordance with one or more embodiments. As illustrated in FIG. 1, the change detection system 100 can include an unmanned aerial vehicle ("UAV") 102, an unmanned aerial vehicle ground station ("UAVGS") 104, a pilot computing device 116, a server device 106, and a client-computing device 112 associated with a user 114 in communication with one another over one or more communication channels. For example, the UAV 102, UAVGS 104, server device 106, and/or client computing device 112 can communicate one with one another over a network 110. Additionally or alternatively, and as further illustrated in FIG. 1, the UAV 102 can communicate with the UAVGS 104 over one or more local wireless or wired communication links (e.g., via a Bluetooth network connection). Although FIG. 1 illustrates one particular arrangement, various additional arrangements are possible. For example, the UAV 102 may communicate directly with the server device 106, bypassing the UAVGS 104. In one embodiment, as shown in FIG. 1, the server device 106 can be a single device. In additional or alternative embodiments, the server device 106 can be a cluster of servers. In this case, the cluster of servers can use various protocols (e.g., "P2P") to communicate among the cluster.

In one or more embodiments, the UAV 102 is an aircraft that can be piloted autonomously or remotely by the pilot computing device 116. For example, as shown in FIG. 1, the UAV 102 and the UAVGS 104 can communicate with or through the pilot computing device 116. Additionally or alternatively, the UAV 102, the UAVGS 104, and the pilot computing device 116 can communicate directly with the network 110.

In one or more embodiments, the UAV 102 can be a drone that can be used for multiple purposes or applications (e.g., military, agriculture, surveillance, etc.). In one or more embodiments, the UAV 102 includes one or more onboard computing devices that control the autonomous flight of the UAV 102. In at least one embodiment, the UAV 102 is a multi-rotor vehicle, such as a quadcopter, and includes a carbon fiber shell, integrated electronics, a battery bay, a global positioning system ("GPS") receiver, a fixed or swappable imaging system (e.g., a digital camera), and various additional sensors and/or receivers.

In one or more embodiments, the UAVGS 104 is a landing apparatus that can receive and dock the UAV 102. For example, the UAVGS 104 can be a box containing a landing cone (e.g., for receiving the UAV 102), a battery replacement system (e.g., for swapping batteries out of and into the UAV 102), a charging system (e.g., for charging the UAV 102), a data transfer system (e.g., for transferring data to/from the UAV 102 and/or the server device 106), and/or a communication system (e.g., for establishing communications with other devices). Once the UAV 102 lands on/in the UAVGS 104, one or more systems contained by the UAVGS 104 can recharge or swap-out the batteries of the UAV 102, download data (e.g., digital photographs, sensor readings, etc.) collected by the UAV 102, communicate the downloaded data to the server device 106, etc.

While FIG. 1 illustrates one client computing device user 114, the change detection system 100 can include more than one user. For example, the server device 106 and the change detection manager 108 thereon may analyze data based on images collected by the UAV 102. Additionally, the change detection manager 108 may provide reports to the user 114 via the client-computing device 112, as will be explained in more detail below. In additional or alternative embodiments, the change detection manager 108 may provide reports to additional users and client-computing devices.

Figure 7:
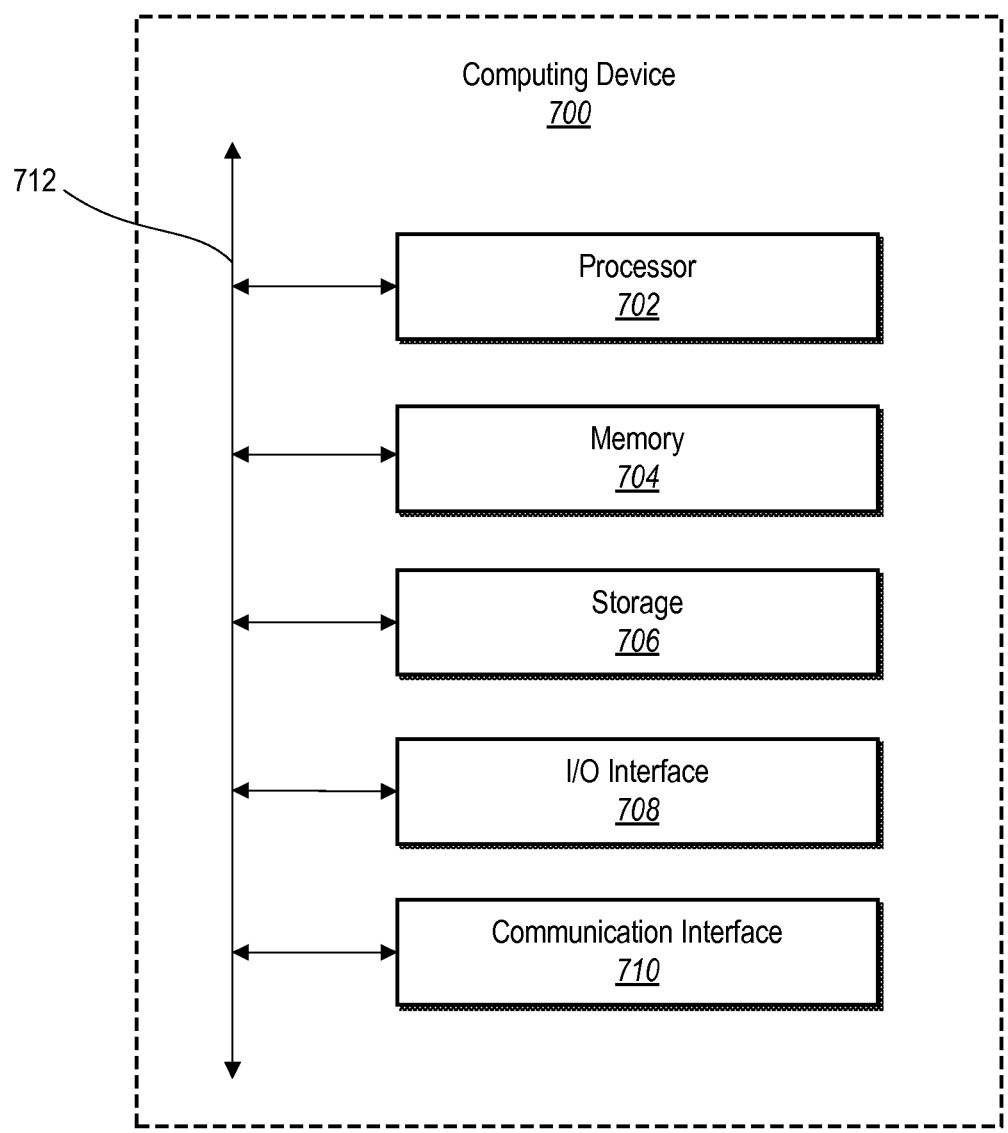
FIG. 7 illustrates a block diagram of an exemplary computing device in accordance with one or more embodiments.

Furthermore, in one or more embodiments, the user 114 may interact with the client-computing device 112 in order to request data and analyses from the server device 106, view reports provided by the change detection manager 108, schedule tasks for the change detection manager 108 and/or the UAV 102, etc. Examples of client-computing devices may include, but are not limited to, mobile devices (e.g., smartphones, tablets, etc.), laptops, desktops, smart wearables (e.g., watches) or any other type of computing device. FIG. 7 and the associated text provide additional information regarding computing devices.

In one or more embodiments, the client-computing device 112 and the UAVGS 104 communicate with the server device 106 via the network 110. For example, the network 110 may include the Internet or World Wide Web. The network 110, however, can include various types of additional or alternative networks that use various communication technologies and/or protocols, such as corporate intranet, a virtual private network ("VPN"), a local area network ("LAN"), a wireless local area network ("WLAN"), a cellular network, a wide area network ("WAN"), a metropolitan area network ("MAN"), any other suitable communication network, or a combination of two or more such networks.

Figure 2:
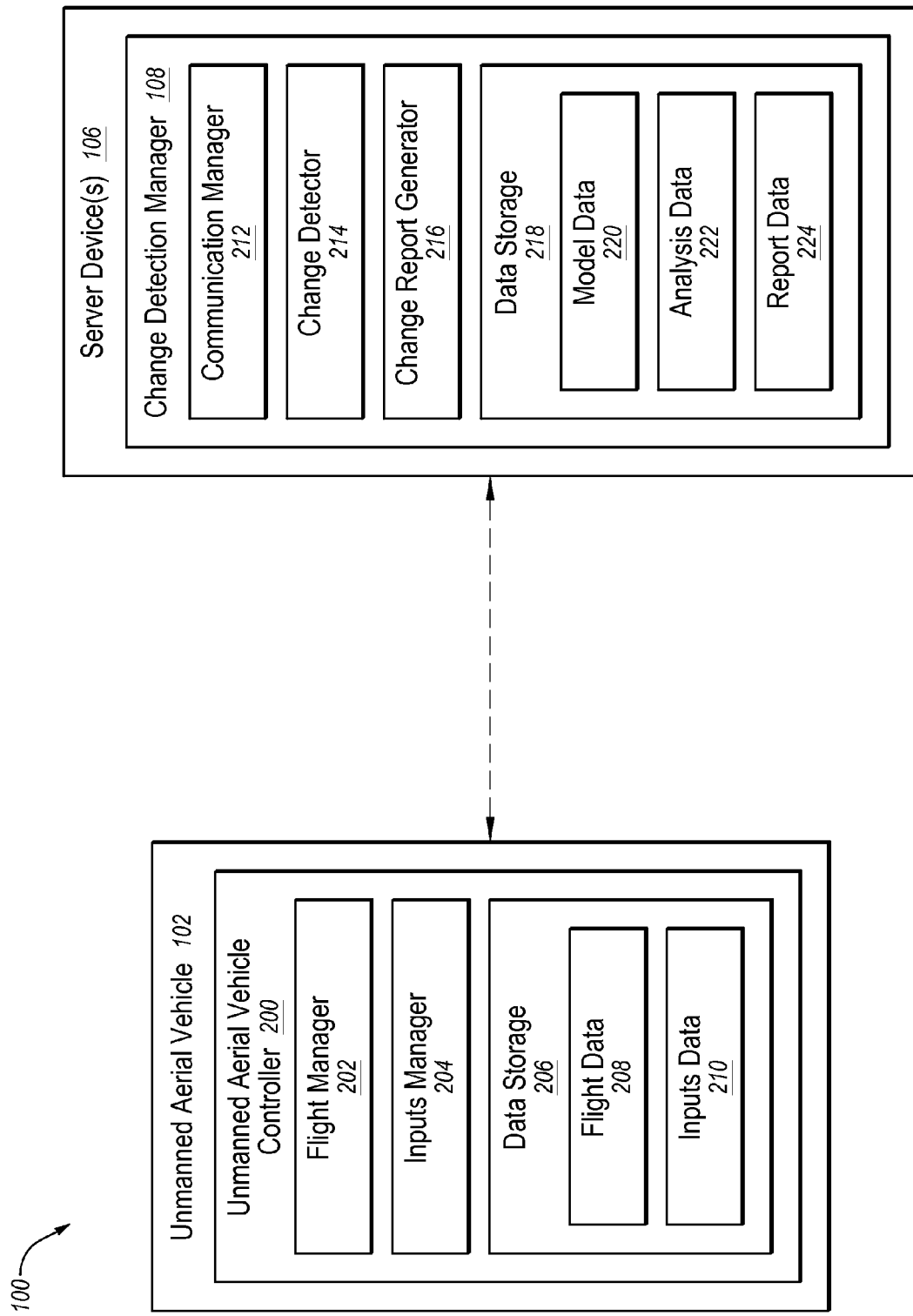
FIG. 2 illustrates a more detailed schematic diagram of the change detection system in accordance with one or more embodiments.

FIG. 2 illustrates a more detailed schematic diagram illustrating an example embodiment of the change detection system 100 (or simply "system 100"). In particular, FIG. 2 shows more details regarding an example embodiment of the UAV 102 and the change detection manager 108 (implemented on the server device 106) of the system 100. As shown in FIG. 2, the change detection manager 108 and the UAV 102 may each include various components for performing the processes and features described herein. For example, the UAV 102 can include a UAV controller 200, which in turn can include a flight manager 202, an inputs manager 204, and a data storage 206 including flight data 208 and inputs data 210. The server device 106 can include a change detection manager 108, which in turn can include a communication manager 212, a change detector 214, a change report generator 216, and a data storage 218 including model data 220, analysis data 222, and report data 224.

Each of the components 202-206 of the UAV, and the components 212-218 of the change detection manager 108 can be implemented using one or more computing devices including at least one processor executing instructions that cause the system 100 to perform the processes described herein. In some embodiments, the components can comprise hardware, such as a special-purpose processing device to perform a certain function. Additionally or alternatively, the components can comprise a combination of computer-executable instructions and hardware. In one or more embodiments, the UAV controller 200 and the change detection manager 108 can be native applications installed on the UAV 102, and the server device 106, respectively. In some embodiments, the UAV controller 200 and/or the change detection manager 108 can be remotely accessible over a wireless network.

As mentioned above, the change detection system 100 analyzes information collected by a UAV 102 in order to identify changes at a target site. For illustrative purposes only, if the target site is a strip mine, the UAV 102 can fly over the strip mine in a predetermined pattern every day and collect digital images of the strip mine. Accordingly, the change detection manager 108 can analyze and compare an image of the strip mine to an image of the strip mine taken one day later in order to determine what differences exist between the two images. The resulting analysis can, for example, help a user understand how much material was removed from the strip mine in a 24 hour period, whether a portion of the strip mine is being affected by erosion, where a new area might be excavated, etc.

As mentioned above, the UAV 102 includes a UAV controller 200. In one or more embodiments, the UAV controller 200 handles all tasks necessary to fly the UAV 102 and capture data related to a target site. Such tasks may include flying the UAV 102, collecting data, and communicating that collected data. As used herein, a "target site" refers to any geographic area for which aerial photography is desired. For example, a target site can include, but is not limited to, construction sites, agricultural sites, mining sites, geological sites, industrial sites, and so forth.

As mentioned above, the UAV controller 200 can include a flight manager 202. In one or more embodiments, the flight manager 202 can control all of the mechanical flight components associated with the UAV 102 (e.g., motors, rotor arms, rotors, landing gear, etc.). For example, the flight manager 202 can modify the speed, pitch, and direction of the rotors and/or rotor arms in response to navigational information from a GPS system, a sensor, a compass, and so forth in order to control takeoff, landing, and general navigation of the UAV 102. Additionally, the flight manager 202 can include one or more controllers that enable the flight manager 202 to compensate for sudden gusts of wind, or other types of flight interferences. In one or more embodiments, the flight manager 202 can navigate the UAV 102 through one or more flight patterns that are pre-loaded prior to takeoff. Alternatively, in at least one embodiment, the flight manager 202 can dynamically generate or modify a flight pattern for the UAV 102 during flight.

As mentioned above, in one or more embodiments, the UAV 102 can include an on-board digital camera as well as other input sources. The inputs manager 204 can control, configure, and otherwise manage any on-board cameras, sensors, or other input sources. For example, the UAV 102 can include and the inputs manager 204 can manage energy receivers (e.g., infrared energy, electromagnetic energy, radio frequency energy, etc.), normalized difference vegetation index ("NDVI") sensors, barometers, spectrometers, etc. Accordingly, in one or more embodiments, the inputs manager 204 can control and manage all input sources associated with the UAV 102. Furthermore, in at least one embodiment, the inputs manager 204 can organize and store all information collected by one or more input sources associated with the UAV 102. For example, the inputs manager 204 can organize and/or store digital photographs taken by a digital camera based on timestamps, geographic locations where the photographs were taken, relative altitudes and angles from which the photographs were taken, etc.

In one or more embodiments, the inputs manager 204 can also communicate information collected from one or more input sources. For example, the inputs manager 204 can provide digital photographs to the UAVGS 104 as part of a data transfer (e.g., wired or wireless) for subsequent delivery to the server device 106. Additionally, the inputs manager 204 can provide input information directly to the server device 106, bypassing the UAVGS 104.

Additionally, as mentioned above and as illustrated in FIG. 2, the UAV controller 200 also includes a data storage 206. As shown, the data storage 206 can include flight data 208 and inputs data 210. In one or more embodiments, the flight data 208 can include data representative of missions, flight paths or plans, GPS information, etc. Similarly, in one or more embodiments, the inputs data 210 can include data representative of information gathered by one or more input sources, such as digital photographs, sensor readings, etc.

As discussed above, the server device 106 includes a change detection manager 108. In at least one embodiment, the change detection manager 108 can perform various steps and/or processes to analyze aerial image data collected by the UAV 102, identify differences among different sets of aerial image data, and/or generate one or more change reports based on the identified differences, as will now be explained in greater detail.

As shown in FIG. 2 and as mentioned above, the change detection manager 108 can include a communication manager 212. In one or more embodiments, the communication manager 212 is configured to establish, facilitate, control, and/or manage communications with other devices/systems, such as the UAV 102, UAVGS 104, and/or client computing device 112. For example, the communications manager 212 can facilitate communications for receiving information collected by the UAV 102. Accordingly, the communication manager 212 can receive digital photographs and any other type of information collected by the UAV 102. Furthermore, the communication manager 212 can facilitate communications with the client-computing device 112 in order to provide reports and analyses generated by the change detection manager 108, as will be explained in more detail below. The communication manager 212 can utilize any suitable communication technologies and/or protocols in order to facilitate the exchange of data.

Also as shown in FIG. 2, the change detection manager 108 can include a change detector 214. In one or more embodiments, the change detector 214 is configured to detect changes at a target site. For example, the change detector 214 can analyze and compare different sets of aerial photography for a target site to identify differences between the different sets. For example, as mentioned above, the UAV controller 200 can provide digital photographs taken of a target site to the change detection manager 108. The change detector 214 can process, analyze, and compare at least two sets of digital photographs in order to identify changes between the two sets. The change detector 214 can also obtain and analyze any other types of data from the target site, such as infrared sensor readings, spectrometer readings, electromagnetic energy readings, etc.

In one or more embodiments, the change detector 214 may select the at least two digital photographs based on user inputs. For example, a user may specify the days for which data should be analyzed, a time period for which data should be analyzed, the type of data to be analyzed, the type of results desired, and/or any other criteria for analyzing data and returning results to the user. To illustrate, the user may specify a target site and request a report of changes occurring at the target site over a period of 24 hours. In this case, the change detector 214 may select a first set of one or more aerial images of the target site with a timestamp corresponding to a beginning of the 24-hour period, and a second set of one or more aerial images of the target site with a timestamp corresponding to an end of the 24-hour period. The change detector 214 can then analyze the images in order to provide a report to the user that identifies the differences identified between two sets of images.

In addition to basing an analysis on different sets of aerial images, the change detector can also base an analysis on a plan, blueprint, or a schematic of a target site. For example, a construction site manager may wish to determine how far a construction project is from completion. Accordingly, the change detection manager 108 can generate a first three-dimensional model of the construction site based on current digital photographs provided by the UAV 102, as described above. The change detection manager 108 can generate a second three-dimensional model of the construction site based on finished plans (e.g., AutoCAD™ files, architectural drawings or plans, etc.) of the construction site provided by the construction site manager. The change detector 214 can then generate a report showing the differences between the target site as represented by the digital photographs and the finished plans.

Once the change detector 214 has received the sets of aerial images (or other data) to be analyzed, in one or more embodiments, the change detector can generate three-dimensional representations (e.g., 3D models) based on the received data. For example, the change detector can generate a first three-dimensional representation based on a first set of aerial images (e.g., from a first time period) and a second three-dimensional representation based on a second set of aerial images (e.g., from a second time period). In order to generate a three-dimensional representation of a target site, the change detector 214 may utilize aerial images taken of the target site from different angles at or around the same time. The change detector 212 can generate the three-dimensional representations using any number of technologies for converting sets of digital images to three-dimensional outputs, such as point clouds or other three-dimensional data sets or models.

As used herein, the term "point cloud" refers to a set of data points arranged in a three-dimensional coordinate system. For instance, a point cloud may refer to the set of data points that represent the external surfaces of one or more objects. For example, the point cloud may represent the external surfaces of one or more objects appearing in the digital images upon which the point cloud is based. To illustrate, a point cloud may include a set of data points on a three-dimensional coordinate system that represent a construction site and the various features (e.g., buildings, terrain, vegetation etc.) of the construction site.

Once the change detector 214 generates a first three-dimensional representation of the target site based on a first set of aerial images of the target site and a second three-dimensional representation of the target site based on a second set of aerial images of the target site, the change detector 214 can next align both three-dimensional representations. For example, in order to align the three-dimensional representations, the change detector 214 can identify reference points or other features that are common to both three-dimensional representations. In one or more embodiments, a reference point or feature can be an intersection of two lines, a prominent edge, a patterned or unique area, and/or any other grouping of data points that enables the change detector 214 to align the two three-dimensional representations. To illustrate, the change detector 214 can identify the same line intersection in a first three-dimensional representation and a second three-dimensional representation. The change detector 214 can then overlay the second three-dimensional representation onto the first three-dimensional representation in a way that aligns the identified common line intersection. In additional or alternative embodiments, the change detector 214 can identify a plurality of reference points in order to accurately align the three-dimensional representations along multiple axes and/or planes.

In at least one embodiment, the change detector 214 can align three-dimensional representations of a target site by using coordinate charts. For example, if a three-dimensional representation of a target site is represented as a point cloud, every point in the point cloud can be associated with a set of coordinates (e.g., three dimensional coordinates along an X-axis, a Y-axis, and a Z-axis, or geographic coordinates based on the location of the reference point relative to the earth's surface. Thus, in at least one embodiment, the point cloud can be represented as a list of coordinate sets. In that case, the change detector 214 can identify common reference points by identifying matching coordinate sets from two lists of coordinate sets representing the two three-dimensional representations of a target site.

With the three-dimensional representations accurately aligned, the change detector 214 can next identify differences between the three-dimensional representations of the target site. In one or more embodiments, the differences between the three-dimensional representations illustrate how the target site has changed over time. For example, if the target site is a building under construction, the first three-dimensional representation of the building may be a point cloud representing the building with only one floor completed. The second three-dimensional representation of the building may be a point cloud representing the building with two floors completed. Thus, by overlaying the second point cloud onto the first point cloud, the change detector 214 can identify that the difference between the two point clouds is the second floor that has been added.

As mentioned above, in at least one embodiment, the change detector 214 may represent a point cloud as a list of three-dimensional coordinates. In this case, in order to identify differences between two aligned and overlaid point clouds, the change detector 214 can simply treat each list of three-dimensional coordinates as a matrix, and subtract one matrix from the other. In one or more embodiments, the resulting matrix consists of values representing the differences between the coordinates from the first point cloud and the coordinates from the second point cloud. From this, the change detector 214 can identify how the second point cloud is different from the first point cloud.

In additional or alternative embodiments, the change detector 214 can identify differences between point clouds in other ways. For example, in one embodiment, the change detector 214 can determine that while the latitude and longitude of a point has not changes, an elevation associated with a point has changed (e.g., as in re-digging a foundation under a building that is temporarily elevated). As such, in this case, the target site (e.g., the building) may not have grown taller, even though the elevations of some or all of the points representative of the target site have increased. In other words, the change detector 214 can take into account the relative distance between points Furthermore, in some embodiments, the change detector 214 can detect changes at a target site that are not based on the comparison of two or more three-dimensional representations. For example, the change detector 214 can analyze data sets provided by a mass spectrometer that indicate a change in material, even though there is no change to the "shape" of the target site (e.g., an area might be excavated and then filled in with a different material, like concrete). In this case, there would be no change between the three-dimensional representations of the target site, even though the target site has indeed changed. Thus, in one or more embodiments, in addition to detecting changes to the location of data points within three-dimensional representations of a target site, the change detector 214 can also utilize other types of data (e.g., from a mass spectrometer, a multispectral normalized difference vegetation index, etc.) to detect changes at the target site.

As mentioned above, and as illustrated in FIG. 2, the change detection manager 108 further includes a change report generator 216. In one or more embodiments, the change report generator 216 generates one or more reports detailing the identified differences between two or more three-dimensional representations of a target site. For example, as described above, the change detector 214 can model and identify differences between representative inputs of a target site (e.g., between sets of digital photographs of the target site). In at least one embodiment, the change report generator 216 can generate a report that details those identified differences.

In one or more embodiments, the change report generator 216 can detail identified differences between two or more three-dimensional representations by generating a two-dimensional representation of the differences between at least two three-dimensional representations. In one or more embodiments, a two-dimensional representation of differences between two three-dimensional representations can be a two-dimensional view of the target site (e.g., a side-view, a top-view, etc.) that illustrates the differences between the two three-dimensional representations. To illustrate, as described above, the change detector 214 can detect the addition of a second floor to a building under construction by comparing a point cloud representing the building at a first time to a point cloud representing the building at a later second time. Thus, in order to detail the difference of the addition of the second floor, the change report generator 216 can generate a two-dimensional side view of the building with a visual characteristic added to indicate the addition of the second floor. In one or more embodiments, the change report generator 216 can represent changes using one or more visual characteristics such as, but not limited to, a color change, a pattern change (e.g., shading, cross-hatching, etc.), a line weight change (e.g., adding thicker or thinner lines), etc.

Each of the visual characteristics may not only represent the presence and location of a change, but also a degree of the change. For example, varying using different shades and colors, the change report generator 216 can indicate differing degrees of change at differing locations of a target site. To illustrate, the change report generator 216 may utilize a combination of different shadings and colors to create a heat map representing the changes at a target site as well as the amount of changes at each location within the target site (e.g., darker, "hotter" colors may indicate more changes than lighter, "cooler" colors). As a result, for example, the change report generator 216 can easily indicate varying levels of excavation or other work that have occurred between the times associated with two sets of aerial images.

Thus, it follows that the change report generator 216 can utilize different visual characteristics in a change report to indicate different types of changes detected between two or more sets of aerial images. For example, the change report generator 216 can indicate different types of changes in a change report with different colors, patterns, etc. To illustrate, if changes to a target site include a building being demolished and large grassy area being planted, the change report generator 216 can indicate the removal of the building by coloring the footprint of the demolished building red. Next, the change report generator 216 can indicate the addition of the grassy area by adding a green patterned overlay on top of the area now occupied by the grassy area. In one or more embodiments, the change report generator 216 can indicate different types of changes such as, but not limited to, demolition, excavation, construction, addition of concrete, addition of asphalt, addition of vegetation, material build-up, etc.

In at least one embodiment, in order to only detail the most significant differences between two or more three-dimensional representations, the change report generator 216 may only include differences that satisfy a minimum threshold. For example, if two three-dimensional representations of a target site are based on digital photographs taken of the target site at two different times, many variations may exist between the two three-dimensional representations due to differences between the digital photographs that result from weather (e.g., a wind storm may cause small amounts of a material to blow away, a rain storm may cause some water to collect at the bottom of an excavation, etc.), traffic (e.g., heavy machinery at a construction site may compress areas within the construction site while moving through the construction site), and so forth. Thus, there may exist many differences between the three-dimensional representations that are not particularly relevant to the target site. Accordingly, in at least one embodiment, the change report generator 216 can identify changes at the target site that are of a given magnitude and/or beyond a predetermined threshold.

To illustrate, as in the example above, the change detector 214 can identify differences between two point clouds that are in a particular percentile among all differences (e.g., in the top twenty percent of all identified differences). For example, the change detector 214 can determine a magnitude of change associated with every detected change at a target site (e.g., the magnitude of change can illustrate the difference between the height/elevation of two corresponding points in two point clouds associated with the target site). Thus, the change detector 214 can rank all detected changes based on their determined magnitudes such that the change detector 214 can easily identify the top twenty percent of all detected changes that have the highest magnitudes of change. Alternatively, the change report generator 216 may initially include all of the identified differences in a generated report, and later remove any identified difference that is not above a predetermined threshold. Accordingly, for example, the change report generator 216 may disregard the most common differences that represent slight changes between the first and the second point clouds, and instead focus on the differences that represent the greatest changes between the first and the second point clouds.

In one or more embodiments, the change report generator 216 may determine that a two-dimensional representation of differences between two three-dimensional representations of a target site includes changes that are beyond a given magnitude. In that case, the change report generator 216 can generate alerts that bring the significant changes to the attention of one or more users. For example, if the target site is a mine, the change report generator 216 may generate a two-dimensional representation of differences at the mine over a course of 12 hours that indicate a significant amount of material in the mine has shifted position (e.g., a possible cave in). Thus, the change report generator 216 can generate an alert indicating this significant shift of materials at the mine. In one or more embodiments, the change report generator 216 can generate an email alert, an SMS text alert, a fax alert, a website update alert, an auto-voice alert over a radio channel, etc.

In additional or alternative embodiments, a user can specify or "bookmark" conditions under which the user wishes to receive an update or alert. For example, if the target site is a reservoir, a user may specify that the change report generator 216 should only send alerts when the water level in the reservoir falls below a certain point. Based on this condition, the change report generator 216 can continuously generate change reports, but may only alert the user when the condition is satisfied.

As mentioned above, the change report generator 216 can generate a report that includes a two-dimensional representation of differences between at least two three-dimensional representations of a target site. The change report generator 216 can include any other information or media (e.g., images, text, graphs, etc.) in the report. The change report generator 216 can provide the generated report to a user (e.g., user 114) via a native application, a website, an email, etc. In at least one embodiment, the generated report can include, but not limited to, one or more annotations associated with the two-dimensional representation, a key or legend to assist the user in understanding the report, a GPS location associated with the target site, a description of the report and/or target site, an overview of the time period(s) represented in the report, and/or any other information available from or relevant to the processes discussed herein.

In at least one embodiment, users can annotate the report provided by the change report generator 216. As such, the change report generator 216 can track, organize, and store the added user annotations. For example, the change detection manager 108 can enable a group of users to share and view a single report generated by the change report generator 216. Thus, the change report generator 216 can track all annotations added to the report, organize the added annotations based on the user associated with each annotation and the time each annotation was added to the report, and store each annotation for later retrieval.

Additionally or alternatively, the change report generator 216 can generate additional annotations associated with the two-dimensional representation. For example, the change report generator 216 can automatically generate annotations that include information detailing the magnitude of the changes at the target site and/or descriptions of the changes. To illustrate, if the target site is a quarry, the change report generator 216 can generate annotations associated with the two-dimensional representation of the changes at the quarry that detail the volume of material has been removed from the quarry in the time period represented.

In one or more embodiments, the change report generator 216 can automatically determine information associated with a detected change based on information available from a design or plan associated with a target site. For example, the change report generator 216 may reference detailed plans for the target site in order to automatically determine additional information associated with each detected change. To illustrate, the change report generator 216 might identify a particular change and a location of the change and then compare the location and/or any other features associated with the change to detailed plans for the target site in order to predict what has occurred to result in the change. Using this information, the change report generator 216 can identify materials associated with the change, a type of work associated with the change, a project or sub-project associated with the change, completion of one or more tasks, and/or a advancements in progress based on the change. The change report generator 216 can then include this information in the report by way of annotations, illustrations, or otherwise.

Additionally, as mentioned above, and as illustrated in FIG. 2, the change detection manager 108 also includes a data storage 218. As shown, the data storage 218 can include model data 220, analysis data 222, and report data 224. In one or more embodiments, the model data 220 can include data representative of one or more three-dimensional models information, such as described herein (e.g., the three-dimensional representations). The analysis data 222 can include data representative of information associated with the analyses of obtained data (e.g., to identify changes between data sets), such as described herein. Finally, the report data 224 can include data representative of one or more reports, such as described herein.

As discussed above, the change detection manager 108 can identify changes at a target site based on data provided by one or more UAVs. Example embodiments of the process by which the change detection manager 108 obtains and analyzes aerial image data will now be described with reference to FIGS. 3A-4E.

FIGS. 3A-3F illustrate a target site (e.g., including a mountain) at two time periods. For instance, FIGS. 3A-3C illustrate various views of the target site at a first time period, and FIGS. 3D-3F illustrate various views of the target site at a later, second time period. FIGS. 3A-3F may also represent three-dimensional models generated by the change detector 214 based on sets of aerial images of the target site captured by the UAV 102. As mentioned above, in order to generate a three-dimensional representation of a target site based on the digital photographs, the change detector 214 may utilize multiple digital photographs of the target site taken from various angles and within a short amount of time (e.g., on the same day). After a period of time elapses (e.g., one hour, one day, one week, etc.), the UAV 102 may capture a second set of digital photographs of the target site. The change detector 214 can then generate a second three-dimensional model of the target site and compare the first and second three-dimensional models in order to identify any changes to the target site. For example, as shown in FIGS. 3D-3F, the target site has changed in that a portion 310 of the mountain has been removed, and a road 312 has been added. As mentioned above, once the change detector 214 can generate and analyze the three-dimensional models of the target site in order to identify the changes that have occurred to the target site.

FIGS. 4A-4E illustrate one example embodiment of the process for generating and analyzing three-dimensional representations of a target site. It will be understood that while the target site used in connection with FIGS. 4A-4E includes a simple shape (e.g., a box), this is for illustration purposes only and the same process can be performed with respect to any number of features (e.g., buildings, terrain, equipment, etc.) of varying shapes and sizes present at a target site.

In one or more embodiments, the change detector 214 can extrapolate reference points from a plurality of digital photographs in order to model the target site in three dimensions. For example, the change detector 214 may extrapolate reference points along the base, top, and sides of surfaces at the target site represented in FIGS. 4A and 4C. The change detector 214 may further extrapolate reference points along one or more surfaces present at the target site.

In response to identifying a plurality of reference points associated the target site, the change detector 214 can create a point cloud of the reference points. For example, FIG. 4A illustrates a first point cloud 400 with reference axes along the X-axis, the Y-axis, and the Z-axis. Although the point cloud 400 illustrates the reference points connected by lines, in additional or alternative embodiments, the reference points may remain in the point cloud with no connecting lines. As shown, the change detector 214 can plot reference points (e.g., such as reference points 402a, 402b, 402c, and 402d) within the references axes. In one or more embodiments, the change detector 214 can extrapolate each reference point's position relative to the other reference points based on provided digital photographs of the target site using various extrapolation algorithms. The resulting point cloud includes a plurality of reference points positioned within the reference axes so as to approximate the shape of the target site.

In at least one embodiment, the change detector 214 can generate a coordinate list associated with the extrapolated reference points. For example, as shown in FIG. 4B, the change detector 214 can generate the coordinate list 404 including sets of coordinates associated with each reference point's position in three-dimensional space. For instance, the reference point 402a is represented by the coordinates 408c, while the reference point 402b is represented by the coordinates 408a, the reference point 402c is represented by the coordinates 408b, and the reference point 402d is represented by the coordinates 408d.

Next, as illustrated in FIG. 4C, the change detector 214 can generate a second point cloud 406 of the target site after a change has occurred to the target site (e.g., the second point cloud 406 indicates a change in height by one unit) in the same manner as described above with reference to FIG. 4A. The change detector 214 can also generate a second coordinate list 410 including sets of coordinates associated with the reference points included in the second point cloud 406 of the target site. For example, as shown in FIG. 4D, the coordinates 408e correspond with the reference point 402f, while the coordinates 408f correspond with the reference point 402g, the coordinates 408g correspond with the reference point 402e, and the coordinates 408h correspond with the reference point 402h.

Once the change detector 214 has generated the coordinate lists 404 and 410, the change detector 214 can identify any differences between the represented point clouds by subtracting the coordinate list 404 from the coordinate list 410. For example, as shown in FIG. 4E, the subtraction of the coordinate list 404 from the coordinate list 410 can result in the coordinate list 412. In one or more embodiments, any set of coordinates shown in the coordinate list 412 that is not "0, 0, 0" represents a difference between the coordinate list 404 and the coordinate list 410, and hence a difference between the point clouds 400 and 406. For example, the coordinates 414a, 414b, 414c, 414d show a positive "1" along the Y-axis. Accordingly, the change detector 214 may determine that a structure at the target site represented by the point clouds 406 and 410 has increased in height by one unit.

Figure 5:
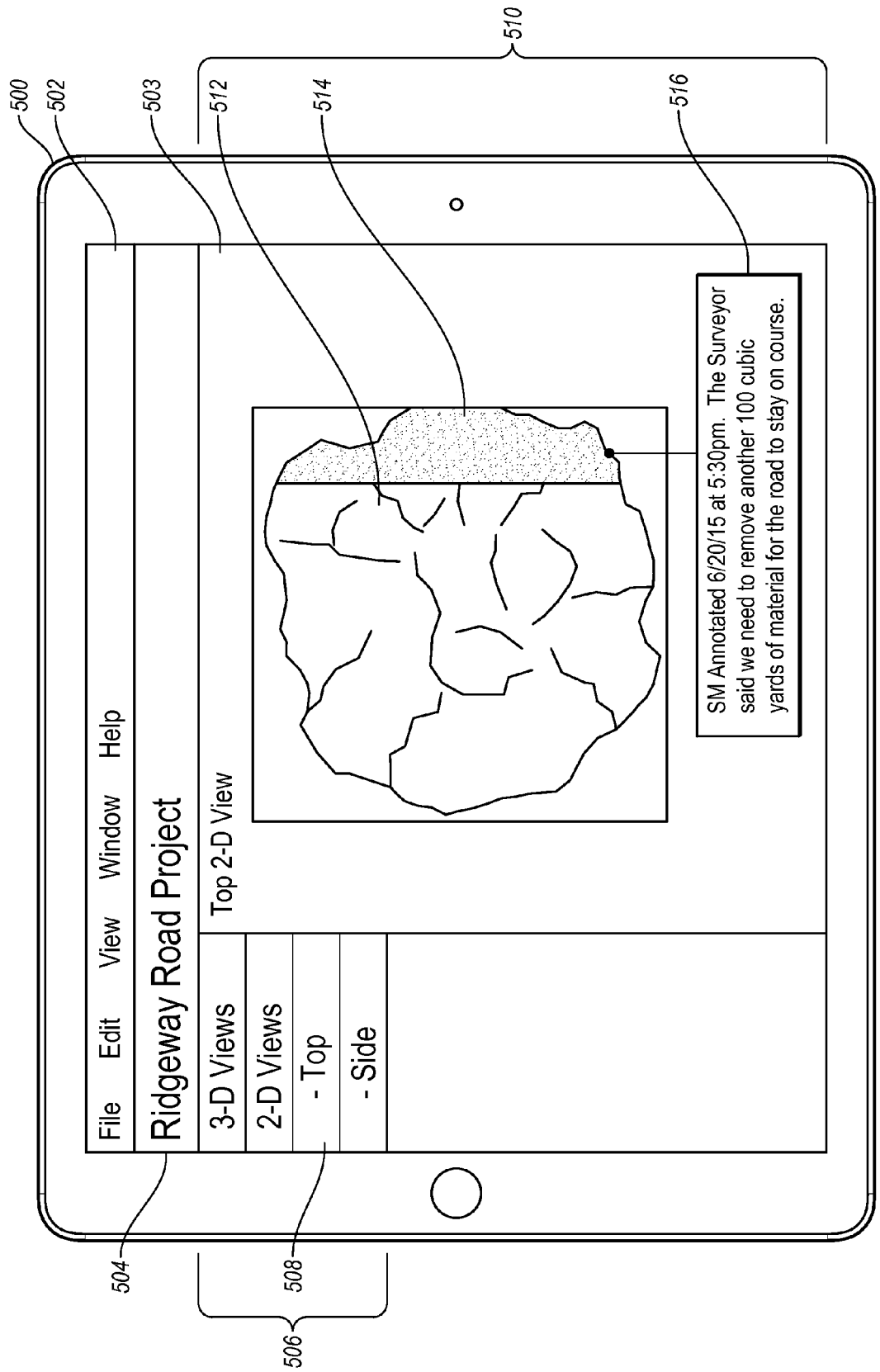
FIG. 5 illustrates an example change report user interface in accordance with one or more embodiments.

As discussed above, once the change detector 214 generates at least two three-dimensional representations of a target site and identifies one or more differences between the three-dimensional representations, the change report generator 216 can generate a report that includes information regarding the detected changes. For example, as shown in FIG. 5, the change detection manager 108 can provide a change detection system interface 503 on a touch screen display 502 of a client-computing device 500 (which, in one or more embodiments, represents the client-computing device 112). In one or more embodiments, the change detection system interface 503 can include a project title 504 and a list control 506. In at least one embodiment, the list control 506 can enable a user to view the various representations and views of the target site as well as representations of the detected changes at the target site.

For example, in response to a user selecting the report control 508, the client computing device 500 can provide the change report 510. In one or more embodiments, the change report 510 can include a two-dimensional representation 512 illustrating one or more changes identified by the change detector 214 at a target site. As shown, a shaded area 514 represents one area of change at the target site. In additional or alternative embodiments, the change can be represented by a color change, a pattern change, etc.

As described above, the change report generator 216 can generate the two-dimensional representation 512 by identifying differences between two or more three-dimensional representations of the target site, as described above. In addition to identifying the differences between the two or more three-dimensional representations of the target site, the change report generator 216 can also identify a magnitude of difference associated with the identified differences. As described above, the change report generator may only focus on the identified differences with magnitudes above a given threshold.

Accordingly, in at least one embodiment, the change report generator 216 can generate the two-dimensional representation based on the identified differences with the greatest magnitudes of difference. For example, as shown in FIG. 5, the two-dimensional representation 512 is a top-view of the target site (as in FIG. 3B), with the target site changes indicated by the shaded area 514 (i.e., representing the differences between the target site in FIG. 3B and the target site in FIG. 3E). Thus, the change report generator 216 may have generated the top-view two-dimensional representation 512 in response to a determination that the changes illustrated in the top-view were of a greater magnitude than the changes illustrated in another view (e.g., a side-view).

In at least one embodiment, the change report generator 216 can indicate the magnitude of differences represented in the two-dimensional representation 512 with a "heat map." For example, rather than providing the shaded area 514, the change report generator 216 can assign a color to each magnitude level of identified differences represented in the two-dimensional representation 512. For instance, the change report generator 216 can assign differences of a greater magnitude deeper, brighter, or more saturated colors, while differences of a lesser magnitude are assigned colors that are lighter, weaker, or less saturated.

Additionally, the change report 510 can include one or more annotations 516 included notes added by one or more users. For example, the change detection manager 108 can enable the two-dimensional representation 512 to be shared among multiple users across multiple client-computing devices. In one or more embodiments, the change detection manager 108 can also enable each of the multiple users to add annotations (e.g., such as the annotation 516) to the two-dimensional representation 512 in an effort to allow the multiple users to collaborate over the two-dimensional representation 512.

Furthermore, in at least one embodiment, the change report generator 216 can generate additional annotations in association with the two-dimensional representation 512. For example, the change report generator 216 can generate additional annotations that detail the magnitude of differences illustrated by the two-dimensional representation 512, the time period represented by the two-dimensional representation 512, an indication of whether the difference represented by the shaded area 514 satisfies a user-defined rule, etc. In one or more embodiments, the change report generator 216 can provide user annotations in one color and generated annotations in a second color so as to assist a user in easily distinguishing between the different types of annotations.

FIGS. 1-5, the corresponding text, and the examples provide a number of different methods, systems, and devices for managing electronic documents. In addition to the foregoing, embodiments can also be described in terms of flowcharts comprising acts and steps in a method for accomplishing a particular result. For example, FIG. 6 may be performed with less or more steps/acts or the steps/acts may be performed in differing orders. Additionally, the steps/acts described herein may be repeated or performed in parallel with one another or in parallel with different instances of the same of similar steps/acts.

Figure 6:
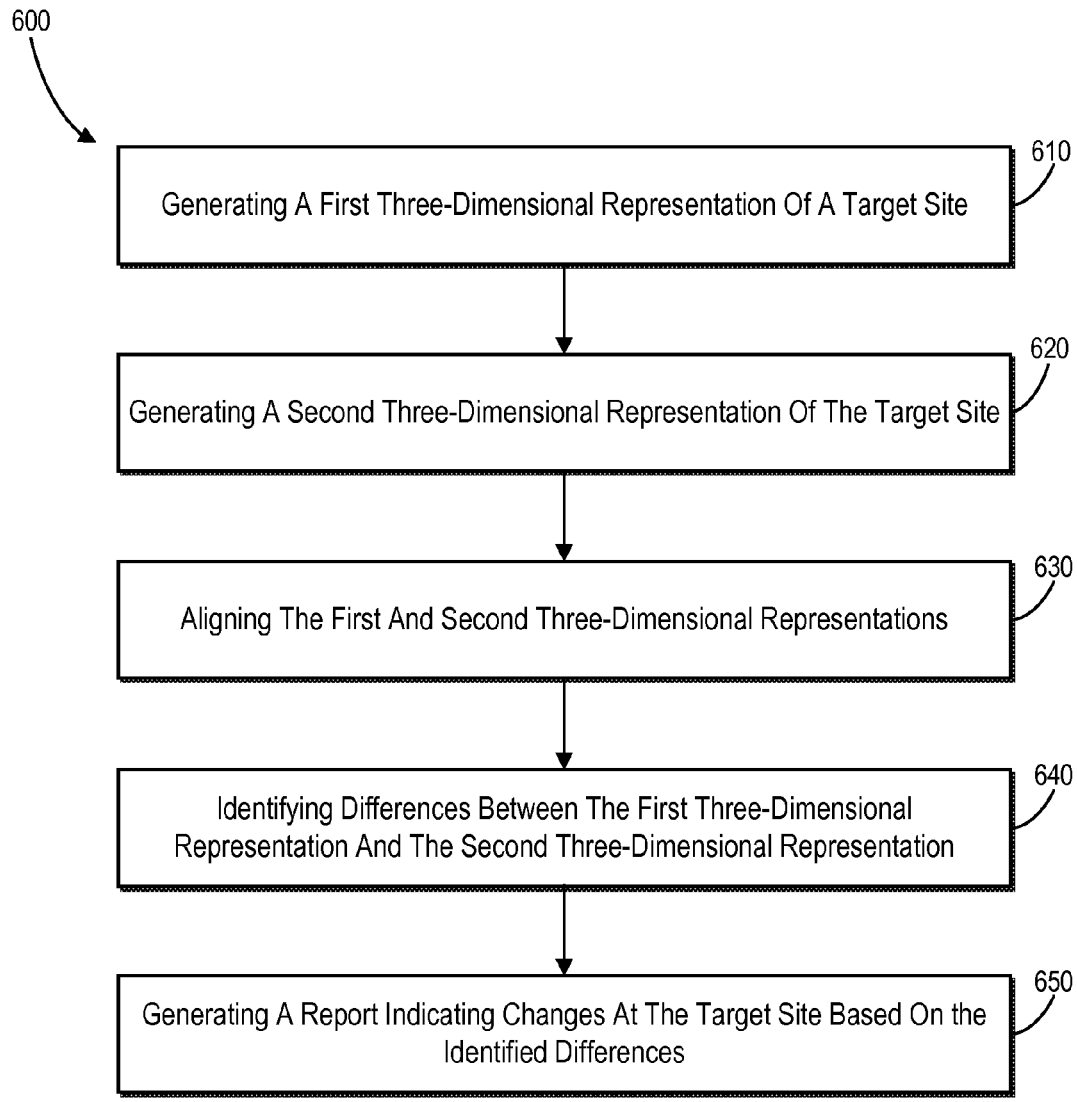
FIG. 6 illustrates a flowchart of a series of acts in an example method of detecting changes at a target site in accordance with one or more embodiments.

FIG. 6 illustrates a flowchart of one example method 600 of detecting changes at a target site. The method 600 includes an act 610 of generating a first three-dimensional representation of a target site. In particular, the act 610 can involve generating a first three-dimensional representation of a target site based on one or more first aerial images of the target site. Additionally, in one or more embodiments, the first three-dimensional representation includes a plurality of first features. In at least one embodiment, a first feature can include a plot point in a point cloud.

The method 600 also includes an act 620 of generating a second three-dimensional representation of the target site. In particular, the act 620 can involve generating a second three-dimensional representation of the target site based on one or more second aerial images of the target site. Further, in one or more embodiments, the second three-dimensional representation includes a plurality of second features. In one or more embodiments, a second feature can include a plot point in a point cloud.

Additionally, the method 600 includes an act 630 of aligning the first and second three-dimensional representations. In particular, the act 630 can involve aligning the first three-dimensional representation and the second three-dimensional representation. In at least one embodiment, aligning the first three-dimensional representation and the second three-dimensional representation includes matching one or more of the plurality of the first features with one or more of the plurality of second features.

The method 600 also includes an act 640 of identifying differences between the first three-dimensional representation and the second three-dimensional representation. In particular, the act 640 can involve analyzing the first three-dimensional representation and the second three-dimensional representation to identify differences between the first three-dimensional representation and the second three-dimensional representation. In one or more embodiments, analyzing the first three-dimensional representation and the second three-dimensional representation to identify differences between the first three-dimensional representation and the second three-dimensional representation includes analyzing differences between one or more of the plurality of first features and one or more of the plurality of second features.

Furthermore, the method 600 includes an act 650 of generating a report indicating changes at the target site based on the identified differences. In particular, the act 650 can involve generating a report indicating changes at the target site based on the differences between the first three-dimensional representation and the second three-dimensional representation. In one or more embodiments, generating a report indicating changes at the target site based on the differences between the first three-dimensional representation and the second three-dimensional representation includes generating a report detailing the differences between one or more of the plurality of first features and one or more of the plurality of second features.

The method 600 can further include an act of identifying a magnitude of one or more of the differences between one or more of the plurality of first features and one or more of the plurality of second features. In at least one embodiment, generating a report indicating changes at the target site can include generating an image including one or more annotations indicating the identified magnitudes for one or more of the differences between one or more of the plurality of first features and one or more of the plurality of second features. In additional embodiments, generating a report further includes removing one or more annotations indicating identified magnitudes for one or more differences that are less than a threshold value. Furthermore, the method 600 can also include assigning a visual characteristic to each of the plurality of second features in the second three-dimensional representation, wherein the assigned visual characteristic is representative of a magnitude of difference between the second feature in the second three-dimensional representation and the corresponding first feature in the first three-dimensional representation.

FIG. 7 illustrates a block diagram of exemplary computing device 700 that may be configured to perform one or more of the processes described above (e.g., as described in connection with the flight manager 128 of the UAV controller 108). One will appreciate that one or more computing devices such as the computing device 700 may implement the system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive ("HDD"), a floppy disk drive, flash memory, an optical disc, a magneto-optical disc, magnetic tape, or a Universal Serial Bus ("USB") drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 710 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 710 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
    generating a first three-dimensional representation of a target site based on one or more first aerial images of the target site;
    generating a second three-dimensional representation of the target site based on one or more second aerial images of the target site;
    aligning the first three-dimensional representation and the second three-dimensional representation;
    analyzing the first three-dimensional representation and the second three-dimensional representation to identify differences between the first three-dimensional representation and the second three-dimensional representation; and
    generating a report indicating changes at the target site based on the differences between the first three-dimensional representation and the second three-dimensional representation.

2. The method as recited in claim 1, wherein:
    the first three-dimensional representation comprises a plurality of first features;
    the second three-dimensional representation comprises a plurality of second features;
    wherein aligning the first three-dimensional representation and the second three-dimensional representation comprises matching one or more of the plurality of the first features with one or more of the plurality of the second features.

3. The method as recited in claim 2, wherein analyzing the first three-dimensional representation and the second three-dimensional representation to identify differences between the first three-dimensional representation and the second three-dimensional representation comprises analyzing differences between one or more of the plurality of first features and one or more of the plurality of second features.

4. The method as recited in claim 3, wherein generating a report indicating changes at the target site based on the differences between the first three-dimensional representation and the second three-dimensional representation comprises generating a report detailing the differences between one or more of the plurality of first features and one or more of the plurality of second features.

5. The method as recited in claim 3, further comprising identifying a magnitude of one or more of the differences between one or more of the plurality of first features and one or more of the plurality of second features.

6. The method as recited in claim 5, wherein generating a report indicating changes at the target site comprises generating an image comprising one or more annotations indicating the identified magnitudes for one or more of the differences between one or more of the plurality of first features and one or more of the plurality of second features.

7. The method as recited in claim 6, wherein generating a report further comprises removing one or more annotations indicating identified magnitudes for one or more differences that are less than a threshold value.

8. The method as recited in claim 6, further comprising assigning a visual characteristic to each of the plurality of second features in the second three-dimensional representation, wherein the assigned visual characteristic is representative of a magnitude of difference between the second feature in the second three-dimensional representation and the corresponding first feature in the first three-dimensional representation.

9. A system comprising at least one non-transitory computer readable storage medium storing instructions thereon that, when executed by at least one processor, cause the system to:
   generate a first three-dimensional representation of a target site based on one or more first aerial images;
   generate a second three-dimensional representation of the target site based on one or more second aerial images;
   align the first three-dimensional representation and the second three-dimensional representation;
   analyze the first three-dimensional representation and the second three-dimensional representation to identify differences between the first three-dimensional representation and the second three-dimensional representation; and
   generate a report indicating changes at the target site based on the differences between the first three-dimensional representation and the second three-dimensional representation.

10. The system as recited in claim 9, wherein:
    the first three-dimensional representation comprises a plurality of first features;
    the second three-dimensional representation comprises a plurality of second features;
    aligning the first three-dimensional representation and the second three-dimensional representation comprises matching one or more of the plurality of the first features with one or more of the plurality of the second features; and
    analyzing the first three-dimensional representation and the second three-dimensional representation to identify differences between the first three-dimensional representation and the second three-dimensional representation comprises analyzing differences between one or more of the plurality of first features and one or more of the plurality of second features.

11. The system as recited in claim 10, wherein generating a report indicating changes at the target site based on the differences between the first three-dimensional representation and the second three-dimensional representation comprises generating a report detailing the differences between one or more of the plurality of first features and one or more of the plurality of second features.

12. The system as recited in claim 11, wherein the instructions, when executed by the at least one processor, further cause the system to identify a magnitude for one or more of the differences between one or more of the plurality of first features and one or more of the plurality of second features.

13. The system as recited in claim 12, wherein generating a report indicating changes at the target site comprises:
    generating an image comprising one or more annotations indicating the identified magnitudes for one or more of the differences between one or more of the plurality of first features and one or more of the plurality of second features;
    removing one or more annotations indicating identified magnitudes for one or more differences that are less than a threshold value.

14. The system as recited in claim 13, wherein the instructions, when executed by the at least one processor, further cause the system to assign a visual characteristic to each of the plurality of second features in the second three-dimensional representation, wherein the assigned visual characteristic is representative of a magnitude of difference between the second feature in the second three-dimensional representation and the corresponding first feature in the first three-dimensional representation.

15. A system comprising:
    one or more unmanned aerial vehicles for capturing one or more first aerial images of a target site at a first time, and capturing one or more second aerial images of the target site at a second time;
    at least server device storing instructions that, when executed by the at least one server device, cause the at least one server device to:
        generate a first three-dimensional representation of the target site based on the one or more first aerial images;
        generate a second three-dimensional representation of the target site based on the one or more second aerial images;
        detect, based on the first three-dimensional representation and the second three-dimensional representation, changes at the target site between the first time and the second time; and
        generate a report indicating the detected changes at the target site.

16. The system as recited in claim 15, wherein detecting, based on the first three-dimensional representation and the second three-dimensional representation, changes at the target site between the first time and the second time comprises analyzing differences between the first three-dimensional representation and the second three-dimensional representation.

17. The system as recited in claim 16, wherein analyzing differences between the first three-dimensional representation and the second three-dimensional representation comprises:
    aligning matched points in the second three-dimensional representation with corresponding points in the first three-dimensional representation; and
    analyzing differences in non-matched points in the first three-dimensional representation and the second three-dimensional representation.

18. The system as recited in claim 17, wherein generating a report indicating the detected changes at the target site comprises generating a reporting image comprising one or more annotations indicating the analyzed differences in the matched points.

19. The system as recited in claim 15, wherein the at least one server device further stores instructions that, when executed by the at least one server device, cause the at least one server device to generate a two-dimensional representation of the target site based on a view of the second three-dimensional representation of the target site.

20. The system as recited in claim 19, wherein generating a report indicating the detected changes at the target site between the first time and the second time comprises indicating, on the two-dimensional representation of the target site, one or more detected changes at the target site between the first time and the second time.

\* \* \* \* \*